United States Patent
Wang

(10) Patent No.: US 7,027,929 B2
(45) Date of Patent: Apr. 11, 2006

(54) SEISMIC DATA INTERPOLATION SYSTEM

(75) Inventor: Xishuo Wang, Calgary (CA)

(73) Assignee: Geo-X Systems Ltd., (CA)

( * ) Notice: Subject to any disclaimer, the term of this patent is extended or adjusted under 35 U.S.C. 154(b) by 0 days.

(21) Appl. No.: 10/719,124

(22) Filed: Nov. 21, 2003

(65) Prior Publication Data

US 2005/0114032 A1 May 26, 2005

(51) Int. Cl.
*G01V 1/28* (2006.01)

(52) U.S. Cl. .................................................... 702/17

(58) Field of Classification Search ................ 702/14, 702/17, 18; 367/73
See application file for complete search history.

(56) References Cited

U.S. PATENT DOCUMENTS

| | | | | |
|---|---|---|---|---|
| 4,042,910 A | 8/1977 | Rietsch | | 340/15.5 |
| 4,203,161 A | 5/1980 | Johnson et al. | | 367/40 |
| 4,630,242 A | 12/1986 | Done | | 367/73 |
| 4,964,098 A | 10/1990 | Hornbostel | | 367/73 |
| 5,235,556 A | 8/1993 | Monk et al. | | 367/73 |
| 5,237,538 A | 8/1993 | Linville, Jr. et al. | | 367/38 |
| 5,642,327 A | 6/1997 | Schiflett et al. | | 367/47 |
| 5,798,982 A * | 8/1998 | He et al. | | 367/73 |
| 5,999,885 A * | 12/1999 | Van Bemmel et al. | | 702/14 |
| 6,169,959 B1 | 1/2001 | Dragoset Jr. | | 702/17 |
| 6,263,284 B1 * | 7/2001 | Crider et al. | | 702/14 |
| 6,388,947 B1 | 5/2002 | Washbourne et al. | | 367/73 |
| 6,463,387 B1 * | 10/2002 | Runnestrand et al. | | 702/16 |
| 6,625,543 B1 * | 9/2003 | Bevc et al. | | 702/14 |

* cited by examiner

*Primary Examiner*—Donald McElheny, Jr.
(74) *Attorney, Agent, or Firm*—St. Onge Steward Johnston & Reens LLC

(57) ABSTRACT

Seismic traces of 3D surveys are interpolated using polynomials in 4D space from a less densely sampled real data set of source points S(x,y) and receiver points R(x,y). Input seismic traces should be pre-processed by normal move out (NMO) and static corrections. Input traces contributing to each single interpolated trace are chosen from a selected number of traces closest to each interpolated trace in 4D space. The methodology in accordance with the invention is designed to minimize computational load. The amplitude of an interpolated trace is modeled with a two-term Amplitude vs. Offset (AVO) formulation.

11 Claims, 13 Drawing Sheets

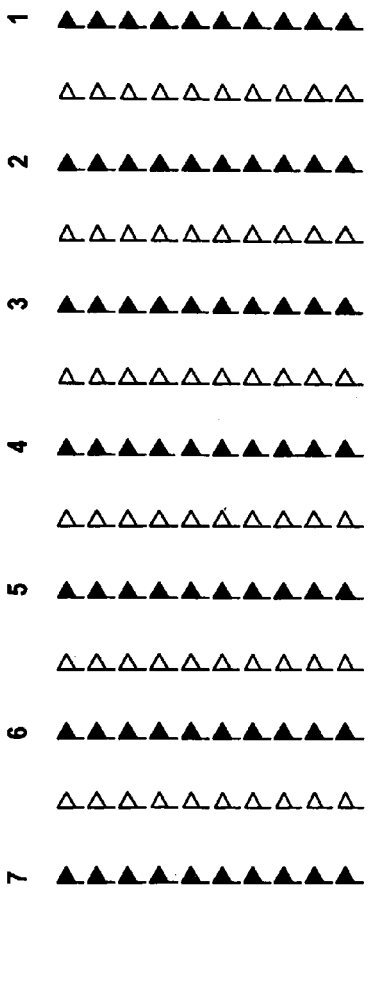
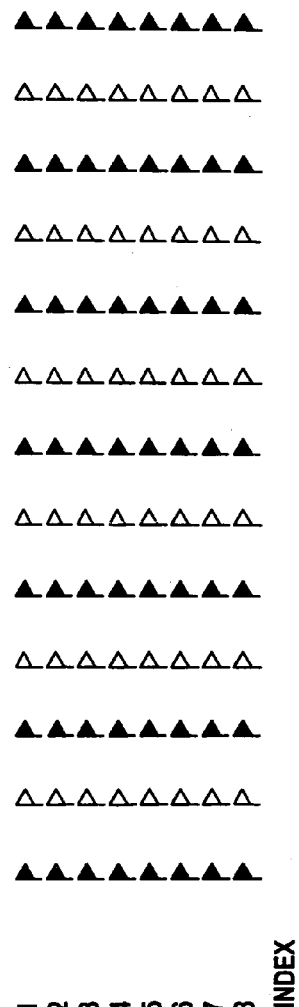
FIG. 5
▲ = A LIVE STN (COINCIDE WITH INPUT STN PATCH
△ = ADDED STN (ALSO FORM LINE IN X DIRECTION)
INTERPOLATED STN PATCH MAP
REDUCE STN LINE SPACING (dY) FROM 480 TO 240
INCREASE # OF STN LINES OF A PATCH FROM 7 TO 13 = (7−1)*2+1
OUTPUT STATION PATCH SIZE = 128*13 IN X+Y; 1664 TRACES PER OUTPUT SHOT
HORIZONTAL    Y SCALE 240m (REDUCED BY HALF)
VERTICAL      X SCALE 16m (NO CHANGE)

SEISMIC DATA INTERPOLATION SYSTEM

FIELD OF THE INVENTION

Seismic traces of 3D surveys are interpolated using polynomials in 4D space from a less densely sampled real data set of source points S(x,y) and receiver points R(x,y). Input seismic traces should be pre-processed by normal move out (NMO) and static corrections. Input traces contributing to each single interpolated trace are chosen from a selected number of traces closest to each interpolated trace in 4D space. The methodology in accordance with the invention is designed to minimize computational load. The amplitude of an interpolated trace is modeled with a two-term Amplitude vs. Offset (AVO) formulation.

BACKGROUND OF THE INVENTION

In the oil exploration industry, seismic data is obtained to enable scientists and engineers to develop a picture of underlying rock formations. The reflection seismic method attempts to image the top few kilometers of the earth's crust by artificially creating a wavefield at the earth's surface and then recording this wavefield at multiple locations as it returns to the surface mainly via reflections within the rock of the earth's crust. These wavefields are then processed in order to obtain images of the subsurface that can be used to help locate hydrocarbons.

As illustrated in FIG. 1, a wavefield is created at the surface at a source location, S, by setting off a percussive shock wave or shot that imparts wave energy into the ground. The shot is typically dynamite or a mechanical vibration system, such as a Vibroseis truck, that creates a sinusoidal signal of changing frequency through shaking the earth. The energy source approximates a point source.

A series of receivers or geophones at receiver points, R, set up as either a linear array (termed 2D seismic) or a two-dimensional array (3D seismic) around S, record the amplitude of wave energy that is received at each receiver point from reflections of the shot energy off underlying formations as a function of time, thus creating an array of time/amplitude data for each geophone location. In FIG. 1, schematically illustrating 3-D seismic, a two-dimensional array of receiver points ((1,1), (1,2), (1,3) . . . ) is shown around the shot, S with representative wave paths that might be received at (1,1) based on reflections off the underlying formations. The recording of the wavefield is not continuous but rather is sampled at discrete time intervals (typically 2 ms intervals) and space intervals, which is determined by the separation distance between geophones (typically 50 meters).

Reflections occur when the wavefield encounters a change in acoustic impedance, usually found at the boundaries between different rock types. Through various mathematical and statistical imaging techniques, an image of the subsurface formations can be determined at varying levels of resolution. As shown schematically in FIG. 1A, a number of traces with a certain density of spatial distribution can be used to develop a picture of the depth and shape of an underlying discontinuity. However, as can be seen from FIG. 1A, no data exists for location A.

From an imaging perspective, it is preferred that the wavefield sampling is intense both in terms of time (ie smaller sampling interval) and space (higher density of shots and geophones). In practice, however, the sampling is usually more than required in time, t, and less than required in space (x,y). In addition, azimuthal sampling is usually less than adequate (that is source to receiver azimuths tend to be similar rather than evenly distributed over 360 degrees) and the distribution of offsets (source to receiver distance) is unbalanced and inadequate.

In general, therefore, the relative density of the shot and/or receiver points in a given area will enable the creation of images with relatively higher or lower resolution. However, as the cost of obtaining an ideally sampled dataset would be prohibitively expensive, the collection of seismic data must always be a balance between acceptable resolution and the cost of obtaining data with an acceptable resolution. Moreover, the collection of seismic data is often affected by other limitations including the specific surface geography of an area where because of specific natural geographical features such as lakes or steep terrain, man-made features, such as roads or buildings, or environmental restrictions, such as wildlife sanctuaries, the placement of shots and geophones in particular areas is prevented, thus leading to incomplete images or images with decreased resolution in particular areas.

Accordingly, as the cost of signal processing is relatively inexpensive compared to the cost of field data acquisition, there continues to be a need to improve the resolution of the images obtained from seismic data using the industry acceptable densities of geophone arrays. In addition, there is a need for systems that enable the interpolation of data into areas where a lack of shots and/or geophones have resulted in a lack of data.

Other Problems with Inadequately Sampled Data

Still further, a common manifestation of inadequate sampling is a low signal-to-noise ratio in the final image. Noise is a direct hindrance to the successful interpretation of seismic data, and great efforts are made to reduce noise. One very successful way to eliminate random or quasi-random noise is to record redundant data. Using this method, all raypaths that reflect from a common point in the subsurface are added together or stacked to create a stacked trace of high fold. As the desired reflection energy adds constructively from each trace, and the random noise does not, the random noise is cancelled out. As a result, the higher the fold, the higher the signal-to-noise ratio.

As noted above, in order to correctly image a geological structure in the subsurface, the surface spatial sampling must be adequate. Sampling theory describes or explains that the steeper an underlying structure is, the tighter the spatial sampling on the surface must be in order to correctly image it. If the spatial sampling is inadequate (ie geophones are too far apart), then spatial aliasing will result giving incorrect images.

Similarly, imaging complex structures may also require adequate sampling from a variety of azimuths to ensure that a variety of raypaths as defined by source-to-receiver raypaths provide sufficient data to avoid the reflection problems realized by complex structures that would otherwise result in a distorted or incomplete image.

Further still, the reflection amplitude and phase are not constant at all angles of reflection where both reflection amplitude and phase will vary with the angle of incidence of the raypath. These variations provide important information about the rock layers at an interface. In addition, various forms of unwanted coherent noise (as opposed to random noise) travel at velocities that differ from the primary (and desired) reflection energy. This difference in recorded arrival times becomes larger with increasing distance traveled (as defined by source-to-receiver offset) and thus can be used to effectively remove the unwanted coherent signal. However, in order to do this, a good balance of source-to-receiver offsets must be present at all points in the recorded dataset.

Further still, various processing steps rely on good statistics throughout the dataset. A less than adequate dataset from the field can limit the quality of the image processing. Steps that are hampered by inadequate sampling include derivation of refraction statics, deconvolution, operator design, reflection statics determination, velocity analysis, various noise attenuation techniques, pre- and post-stack migration and all reservoir analysis techniques, such as AVO/LMR analysis that use the variation of reflection amplitude with offset as their input. Shortcomings introduced by inadequate statistics in any of these steps can seriously impact the final image integrity.

As a result, there is a need for a system that continues to address the problems identified above with respect to the collection and interpretation of seismic data. In particular, there has been a need for a system that conveniently and effectively enables the interpolation of seismic data to provide an accurate or improved resolution of underlying formations around which there may be a shortage of data.

SUMMARY OF THE INVENTION

The invention seeks to assist in predicting the formation structure at a location where a shot or geophone may not be present by providing a method for interpolating data obtained from adjacent shots and geophones.

Generally, the technique involves fitting a multi-order polynomial equation to the data from multiple locations around the desired location.

More specifically, there is provided a method of generating output seismic trace data at a specified location from input seismic trace data from known locations comprising the steps of selecting a specified location for the output data, selecting input data at known locations for fitting to a multi-order polynomial equation, obtaining polynomial fit parameters of the multi-order polynomial equation and utilizing the polynomial fit parameters to obtain output data at the selected location.

In further embodiments, the step of selecting the location for the output data includes selection of both a desired source point and a desired receiver point.

In another embodiment, the step of selecting input data at known locations for fitting to a multi-order polynomial equation includes selecting input data within a specified range of the specified location of the output data.

In a still further embodiment, the input data within the specified range is further restricted by selection of input data closest to the specified location of the output data.

In one embodiment, the step of obtaining polynomial fit parameters of the multi-order polynomial equation is solved numerically by a singular value decomposition of a matrix, C, defined by $C=ULV^T$ and in another embodiment a transformed coordinate system is utilized to speed up the computation time required to solve for the polynomial fit parameters of an interpolated trace.

In yet another embodiment, each of the steps is repeated to form a shot gather corresponding to predicted receiver trace data at known or unknown locations and corresponding to a known source location or predicted source location.

In another embodiment, the specified location is a known location and the method is utilized as a means of reducing random noise associated with the trace data at that known location.

In another embodiment, the invention provides a method of creating a shot gather from known seismic trace data obtained from a plurality of known locations within an x,y grid, the method comprising the steps of:

selecting a source location within the x,y grid to which the shot gather will correspond;

selecting a plurality of receiver positions that will form receiver positions for the shot gather wherein at least one of the source location or receiver positions is an unknown position;

selecting a plurality of receiver traces having known positions as input traces and utilizing the known receiver traces to predict receiver trace data at a location adjacent the known receiver positions utilizing a least-squares fitting. model;

repeating the third step for all selected receiver positions so as to form a shot gather corresponding to the source location.

In a further embodiment, the source location is a location on the x,y grid that does not correspond to an actual source location.

BRIEF DESCRIPTION OF THE DRAWINGS

The invention is described with reference to the following drawings wherein:

FIG. 5 is a schematic diagram of receiver patch size of 128 by 13 with added stations;

FIG. 11 shows a predicted shot gather for shot 388 in which the system was used to predict the shot gather utilizing all real shot gather traces; and, FIG. 12 shows the difference between the predicted data of FIG. 11 and the raw data of FIG. 7.

DETAILED DESCRIPTION OF THE INVENTION

With reference to the Figures, a system for the interpolation of seismic data utilizing known seismic data is described. The system provides a method of processing known seismic data for predicting seismic data at locations for which no data is known utilizing a multi-order polynomial fit methodology.

Figure 1:
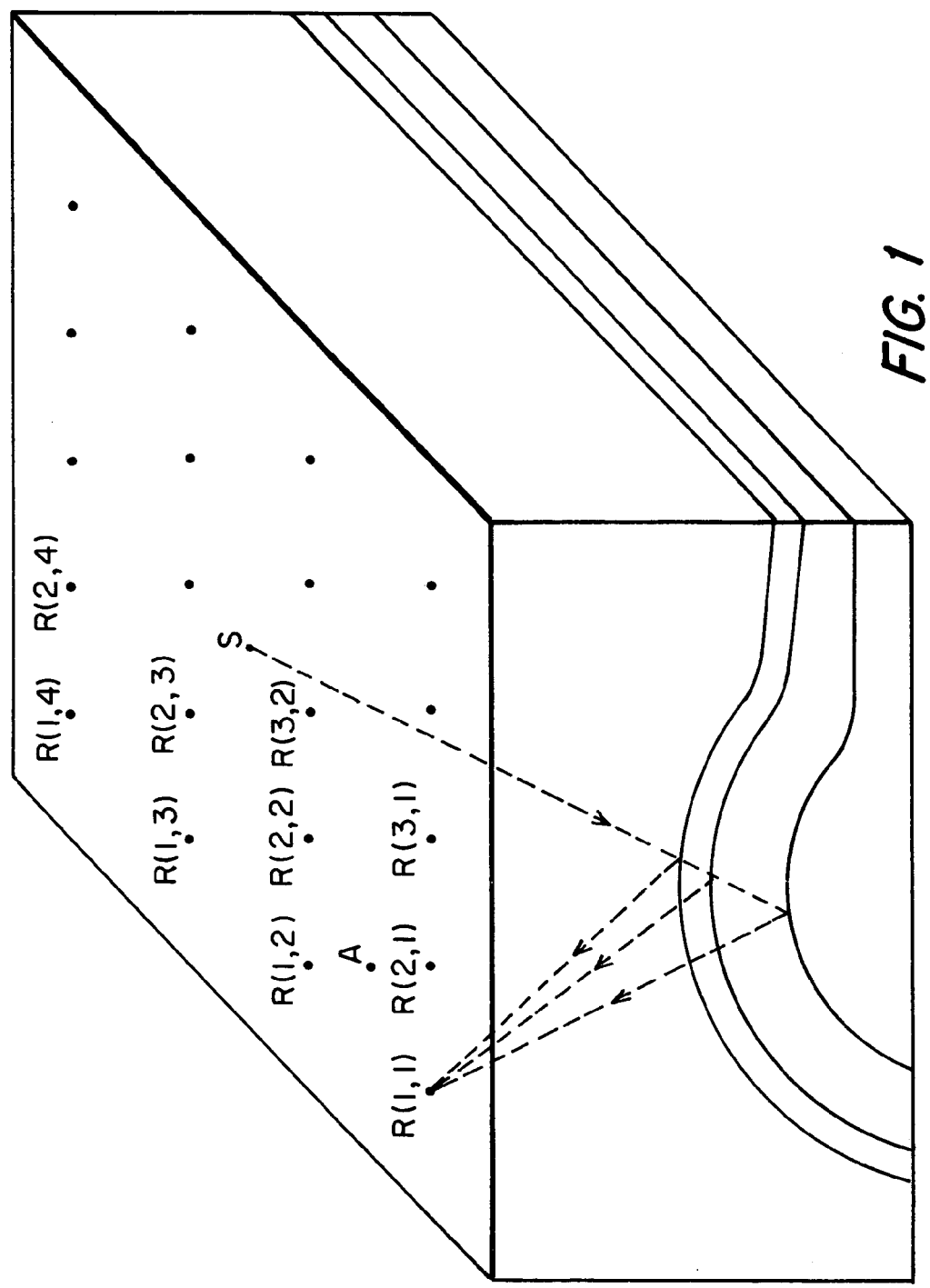
FIG. 1 is a schematic isometric diagram of an array of receiver points, R, around a shot point, S, showing possible raypaths to receiver point (1,1).
Figure 1A:
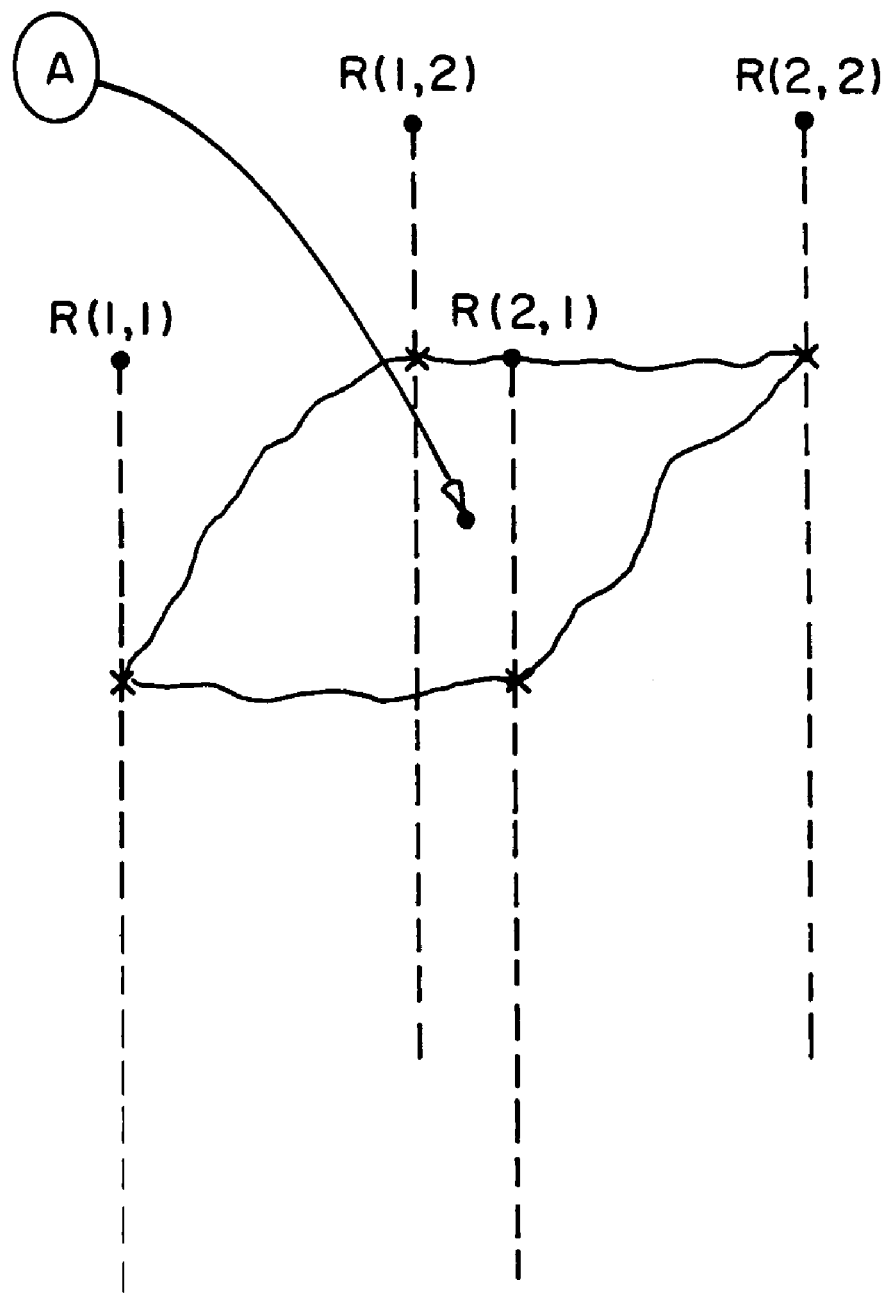
FIG. 1A is a schematic diagram of part of a regular receiver grid at four receiver points.
Figure 2:
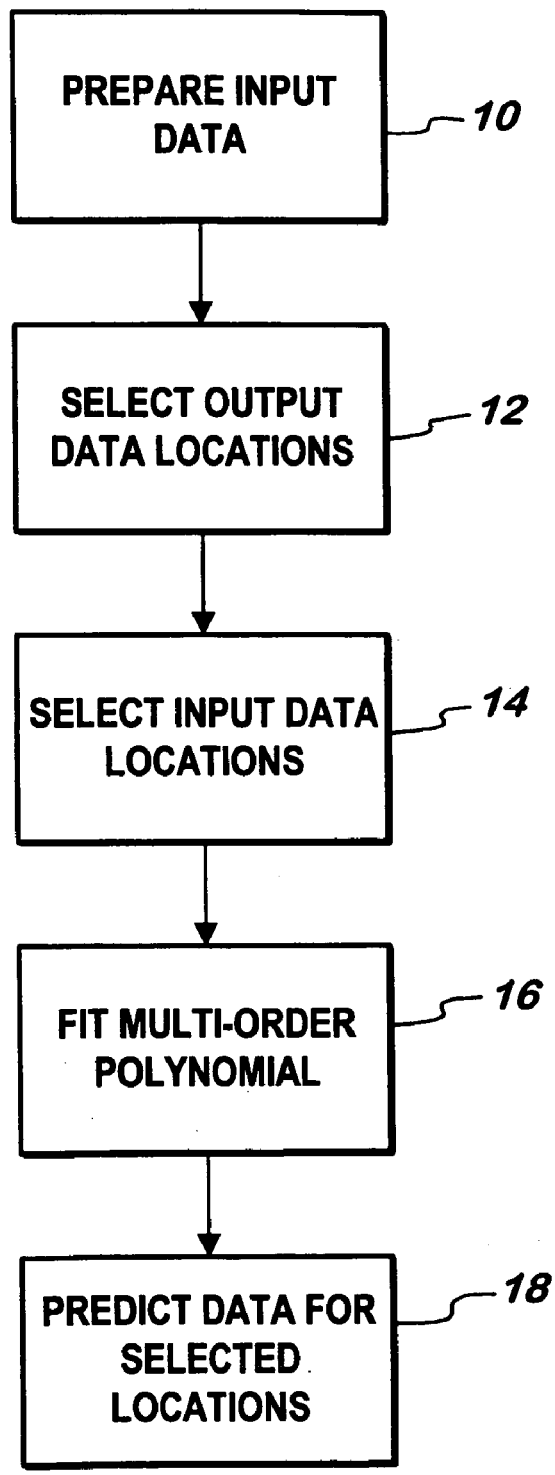
FIG. 2 is a flow chart of the main steps in accordance with the invention.

In accordance with the invention, seismic data (amplitude, time) obtained from an x,y grid of known seismic data is utilized to obtain predicted data arrays at locations within the grid where no data has been obtained. As shown in FIG. 1A, the invention enables the prediction of seismic data at a receiver location A for which no data has been collected. The methodology of the invention generally includes the steps of preparing the input data 10, selecting the location of the output or predicted data 12, selecting the location of the nearest location input data 14, fitting the input data to a multi-order polynomial equation 16 and thereafter utilizing the polynomial parameters of the fit equations 18 to obtain predicted data arrays at the selected locations. The basic processing steps are repeated in order to prepare shot gathers that present trace data corresponding to known or unknown shot locations and known or unknown receiver locations. The methodology is also effective in providing shot gather data that has been filtered to eliminate random noise associated with actual trace data.

Preparing Input Data 10

Initially, it is preferred that unstacked input data is preprocessed in accordance with known prestack signal processing steps including but not limited to deconvolution, amplitude scaling, statics, velocities, noise attenuation, spherical divergence corrections, static corrections and normal moveout (NMO) corrections and others as may be known to those skilled in the art. Pre-processing may take place at any stage prior to fitting 16.

Select Output Data Locations 12

The location of a new predicted data point (one single time sample) at a new output location $x_s, y_s, x_r, y_r$ is selected. The selection of the location of the predicted data point may be based on a desire to increase data resolution between lines of actual data or by a desire to predict data at a location from which neither a shot or receiver could be established by virtue of geographical limitations.

More specifically, it is preferred that selecting the output data location involves defining a) the desired source point and b) desired receiver patch locations where a prediction is desired and defining the x,y regions where you have both c) actual source point and d) actual receiver point data. The desired source point and receiver patch locations are preferably in the form of a rectangular grid.

Select Input Data Locations 14

All input data amplitudes within a specified distance of the new output's x,y location and at the same time are defined as input samples. The input data selection will preferably be within a formula based range such as an ellipse or circle, although other ranges may be defined.

In greater detail, and in a preferred embodiment, input data is chosen with "nearby" common mid points (CMPs). In this embodiment, for every output data trace with source location at $(x_s,y_s)$ and receiver location at $(x_r,y_r)$, input traces are chosen for interpolation. An input trace with source location at $(x_s,y_s)$ and receiver location at $(x_r,y_r)$ may satisfy a specific formula based condition such as that which defines all input data within an ellipse (or other shape such as circle), $$\frac{(x_m - x_m)^2}{r_x^2} + \frac{(y_m - y_m)^2}{r_y^2} \leq 1 \qquad (1)$$

where $x_m=(x_s+x_r)/2$, $y_m=(y_s+y_r)/2$, $x_m=(x_s+x_r)/2$, $y_m=(y_s+y_r)/2$, and $r_x$ and $r_y$ are user specified sizes, the larger the more spatial mixing effects will occur.

The data may be further restricted to choose data in "nearby" 4D space. For example, from the above, there may be many input traces satisfying the proximity conditions defined by an ellipse. However, in one embodiment, only k input traces will be kept, with k being defined as the kept trace number or user specified input fold. The higher the input fold, the cleaner the interpolated traces will be. The kept traces (k) are the ones the closest to the desired trace to be interpolated in 4D space, defined by distance in 4D, $$d_4 = [(x_s - x_s)^2 + (y_s - y_s)^2 + (x_r - x_r)^2 + (y_r - y_r)^2]^{1/2} \qquad (2)$$

$$= d_4(x_s, y_s, x_r, y_r, x_s, y_s, x_r, y_r)$$

Only the k input traces with the smallest $d_4$ will be kept with the input traces being ranked for selection. The total of k input traces have their source & receiver location denoted by $$x_s(j), y_s(j), x_r(j), y_r(j), j=1, 2, \ldots k \qquad (3)$$

Practically, k=15–100 input traces with 15 being the minimum to be able to solve a $2^{nd}$ order polynomial in 4D space. The selection of k is a trade-off between computation time and the benefits of obtaining a smoother interpolated trace that is less corrupted by noise and mixing effects.

Fit Multi-Order Polynomial 16 and Predict Data for Selected Location 18

A multi-order polynomial is fit to the amplitudes of the input samples. Practically, a second-order polynomial of 15 coefficients is usually adequate. However, a polynomial of higher order is generally preferred for more complex structures, steeper dips, when the 4D distance between input traces and desired output location becomes large and to accommodate complex AVO effects.

At a time sample t, t=dt, 2dt, . . . Ndt, the jth input trace has amplitude, $$A\{t, x_s(j), y_s(j), x_r(j), y_r(j)\} \equiv A(t, x_j) \qquad (4)$$

It is fitted to a polynomial in the 4D coordinates:

$$P(x) = \sum_{i,j,k,l=0}^{i,j,k,l \leq m, i+j+k+l \leq M} a_{ijkl} x_s^i y_s^j x_r^k y_r^l \qquad (5)$$

where, m & M are user specified single and total power numbers, the higher m & M, the more accurate the input amplitudes can be fitted, and the higher the resolution of the fitting. The polynomial coefficients, $\alpha_{ijkl}$ are solved by minimizing:

$$E^2 = \sum_{j=1}^{k} [A(t, x_j) - P(x_j)]^2. \qquad (6)$$

This is equivalent to solving the least squares solution to the set of equations:

$$P(x_j) = A(t, x_j), j=1, 2, \ldots k \qquad (7)$$

The set of equations above are linear in unknown polynomial coefficients $\alpha_{ijkl}$. With $\alpha_{ijkl}$ solved, interpolation is performed by substituting the coordinates of the trace to be interpolated into the polynomial:

$$P(x) = P(x_s, y_s, x_r, y_r). \qquad (8)$$

The amplitude of the new output location is predicted by the polynomial at the new output location x,y coordinates.

The time sample at t of the pre-stack trace at $(x_s,y_s,x_r,y_r)$ has now been interpolated.

The steps are repeated for all time samples in order that the pre-stack trace at $(x_s,y_s,x_r,y_r)$ is interpolated and complete arrays of interpolated shots are created. This completes the interpolation of the full data set.

The system is preferably implemented in an output-oriented way enabling user-selection of data-selection and data-handling parameters as explained in greater detail below.

System Optimization

In various embodiments, the system may be optimized in accordance with the following methodology.

Preparation

Write equation (7) in matrix form:

$$\begin{vmatrix} & & \\ & \cdots & \\ \cdots & x_s^i(u)y_s^j(u)x_r^k(u)y_r^l(u) & \cdots \\ & \cdots & \\ & & \end{vmatrix} (a_{ijkl}) = A(t, x_u) \text{ or,} \quad (9)$$

$$Ca = A \quad (10)$$

In (9), each equation represents one input trace having an arbitrary order. In the vector a, the order of polynomial coefficients is also arbitrary, but for convenience, its $1^{st}$ element is $a_{0000}$.

The matrix C has its singular value decomposition:

$$i \ C = ULV_T, \quad (11)$$

where superscript T denotes matrix transpose, and L is a diagonal matrix of positive singular values, $(\ldots L_e \ldots)$. The singular value decomposition of C can be easily solved by many readily available numerical software packages.

The generalized inverse of matrix C, denoted by $C^{-g}$, is given by $$C^{-g} = VL^{-1}U^T. \quad (12)$$

where, $L^{-1}$ is a diagonal matrix of ( $\ldots 1/[L_e + \epsilon^2] \ldots$ ), and $\epsilon^2$ is a small positive damping, the effect of which is to stabilize the matrix inversion and at the same time interpolated results will be smoother and cleaner. This generalized inverse provides a solution to polynomial coefficient vector, $$a = C^{-g}A \quad (13)$$

This is a least squares solution when matrix C has more rows than columns.

To speed up the solution of equation (9) or (7), since matrix C is not time dependent, $C^{-g}$ is also time independent. $C^{-g}$ needs to be calculated only once for all the time samples of this pre-stack trace to be interpolated.

This reduces computation to 1/(number of time samples per trace), typically 1000+ time samples.

To speed up the calculation of equation (8), the origin of 4D space is moved to the position of the trace to be interpolated, i.e., replace $(x_s,y_s,x_r,y_r)$ by $(x_s-x_s,y_s-y_s,x_r-x_r,y_r-y_r)$. In this transformed coordinate system, the position of the trace to be interpolated becomes $(0,0,0,0)$. Interpolating the trace by substituting its position into the polynomial, only the zero power term survives. In other words, the interpolated sample is the constant term of the polynomial, i.e. $a_{0000}$. Therefore, instead of solving the full vector of polynomial coefficients, and calculating the value of the polynomial at the location of the trace to be interpolated, we only need to solve $a_{0000}$, in the transformed coordinate system. From (13) it is seen that, only the row of $C^{-g}$ corresponding to $a_{0000}$ needs to be calculated, and $$a_{0000} = C^{-g}(1^{st} \text{ row}) * A,$$

where, "*" denotes dot product of two vectors.

This reduces computation of polynomial coefficients to 1/(number of polynomial coefficients), and completely removes the need of calculating the value of polynomial at the output position.

To speed up the whole process of interpolating one pre-stack trace at $x_s$, $y_s$, $x_r$, $y_r$ for all t-samples, combining the above two, the interpolated trace is a weighted sum of the input traces with the weights being the elements of the 1st row (corresponding to $a_{0000}$) in the time independent $C^{-g}$:

$$A(t, x_s, y_s, x_r, y_r) = \sum_{j=1}^{k} C_{1j}^{-g} A(t, x_s(j), y_s(j), x_r(j), y_r(j)), \quad (14)$$

in which $C_{1j}^{-g}$ is time independent and is a function of input trace positions (x, y) and the position of the interpolated trace (x, y).

User Options

As indicated above in various embodiments, it is preferred that the user be able to specify various options including:

1. Output Shot Gathers

A rectangular shot grid in (x,y) including shot start/end x and y coordinates and how many shots between start/end x and y coordinates as well as a rectangular receiver patch grid relative to each shot of the shot grid.

2. Output Common Mid-Point (CMP) Gathers

A CMP grid in (x, y) including CMP start/end x and y coordinates and how many CMPs between the CMP start/end x and y coordinates. In addition, it is preferred that n offset/azimuth patch for each CMP gather is enabled including a shot/receiver offset (minimum and maximum and how many in equal interval) and shot/receiver azimuth (minimum and maximum and how many in equal interval).

In both cases, in order to avoid extrapolation, not all points in the grids can either have a live shot/receiver or within some CMP gathers it may be impossible to create some or all of the desired offsets/azimuths.

EXAMPLES

A number of tests were performed on both real and synthetic data.

Synthetic Data

Testing using synthetic data utilized a delta function approach. A zero phase wavelet is reflected from a tilted boundary with random source and receiver locations about a common mid-point (CMP). The gathered traces contain the same wavelet placed at calculated arrival times. With such an input data set, interpolation to the same locations has resulted in near perfect results.

Field Data

A few field-data sets have been utilized that provide satisfactory interpolation results as detailed below.

Figure 3:
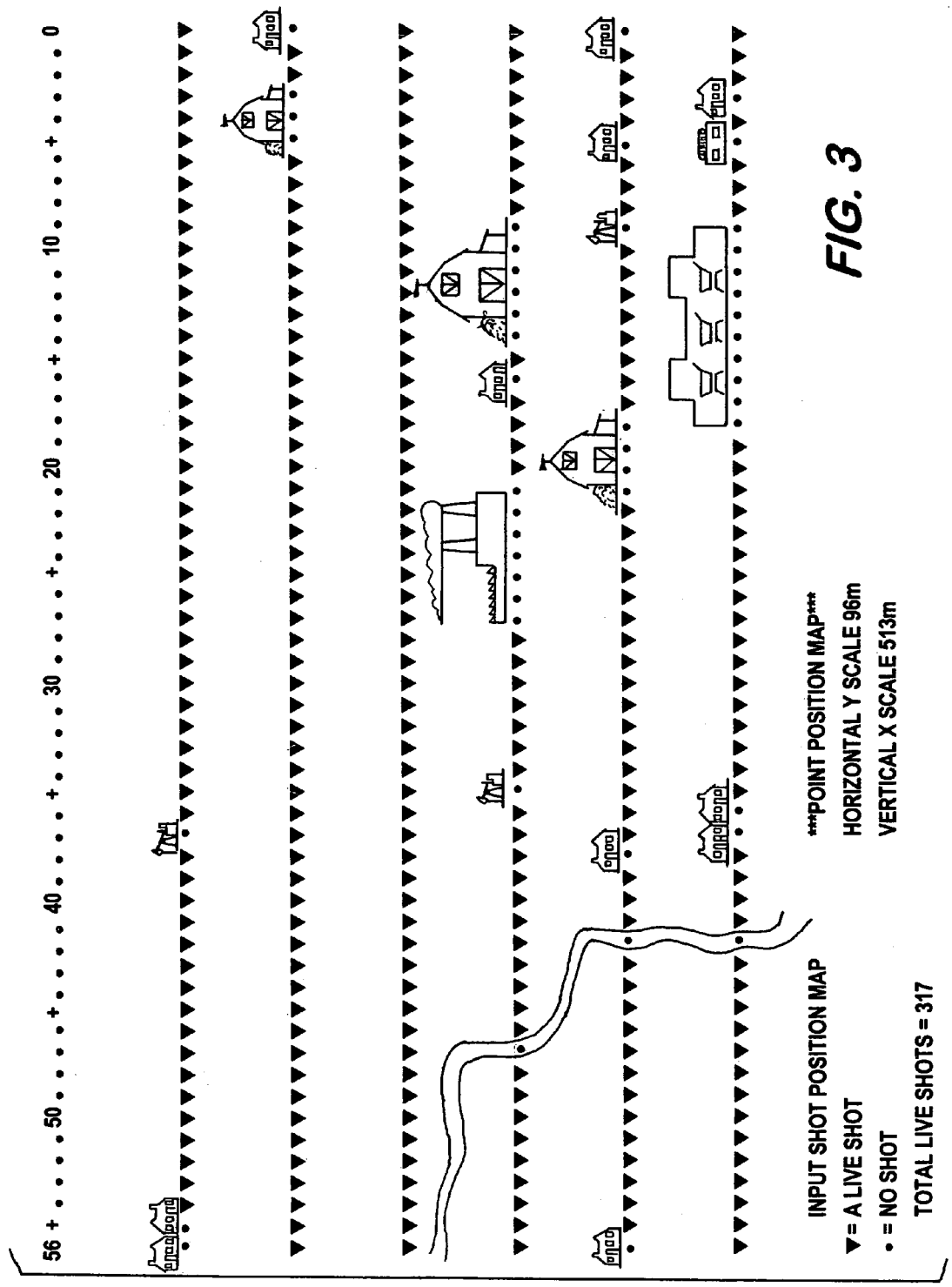
FIG. 3 is a schematic diagram of input shot positions on a 96 by 513 m grid.

Sources form a grid with x and y intervals of dx=513 & dy=96 meters, with 6 shot lines oriented in the y direction, and 56 shots per line. Note that geographical features and dead shots either prevented a shot from being made or resulted in a no shot. The total number of live shots is 317 as shown in FIG. 3.

The shot data was received with receivers forming a grid with x and y intervals of dx=16 & dy=480 meters, with 12 receiver lines oriented in the x direction, and 160 receivers per line (not shown).

Figure 4:
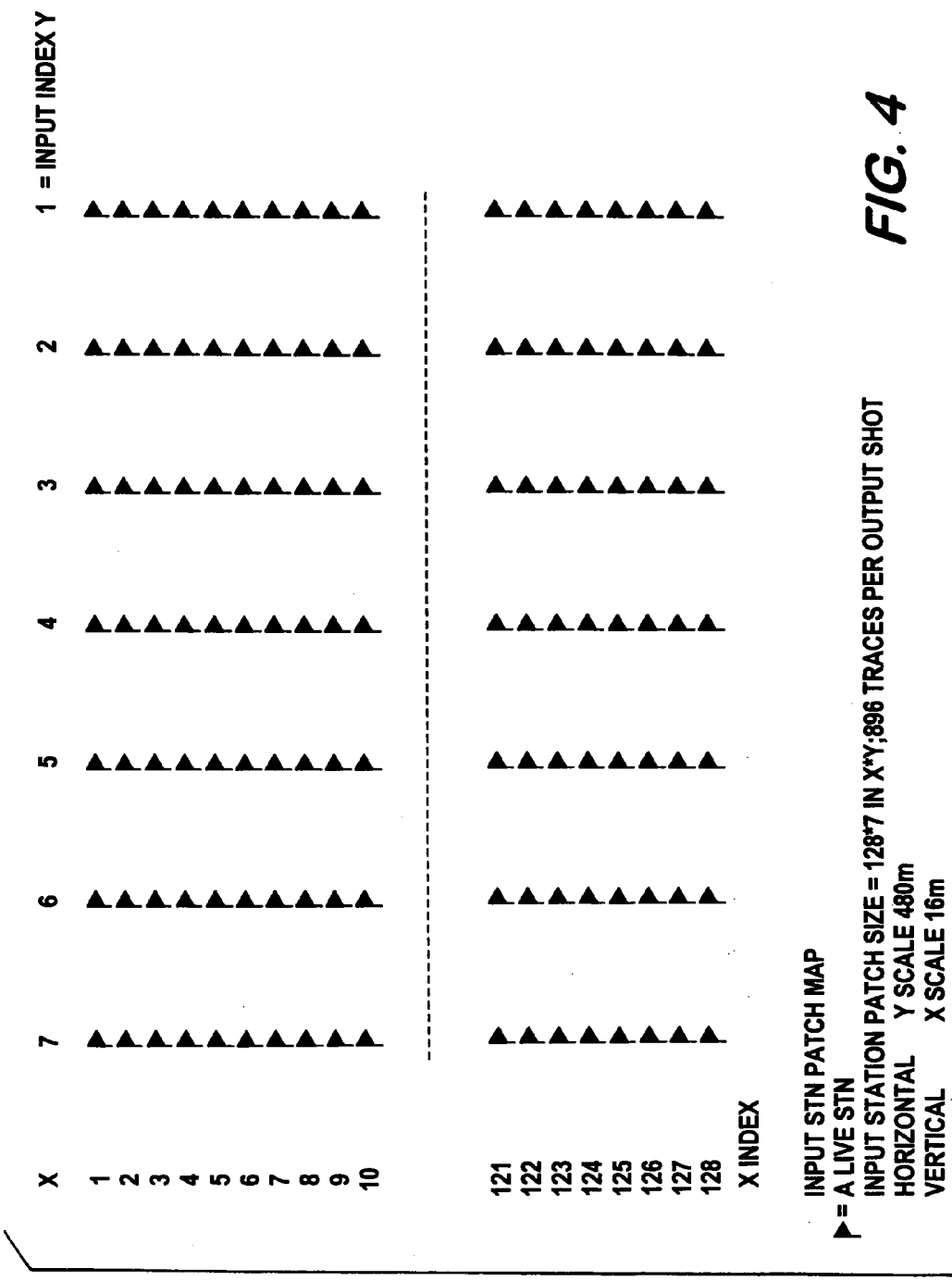
FIG. 4 is a schematic diagram of a line receiver patch having 7 receiver lines and 128 receivers.

A live receiver patch for each shot has 7 receiver lines and 128 receivers per line as shown in FIG. 4. Thus, there are 896 traces per input shot.

Both source and receivers occupy the same rectangular zone of 2550 by 5280 (x by y) meters.

In accordance with the invention, interpolation tests were performed to:

a) Expand the Receiver Patch/grid

As shown schematically in FIG. 5, the number of receivers per line (128) was kept the same, but an additional receiver line was inserted, via interpolation, between the existing 7 receiver lines of the patch thus increasing the number of receiver lines in the patch to 13. This is equivalent to reducing the receiver line spacing from 480 to 240 meters. All interpolated receivers were within the rectangular zone of existing receivers.

b) Expand the Source Grid

Figure 6:
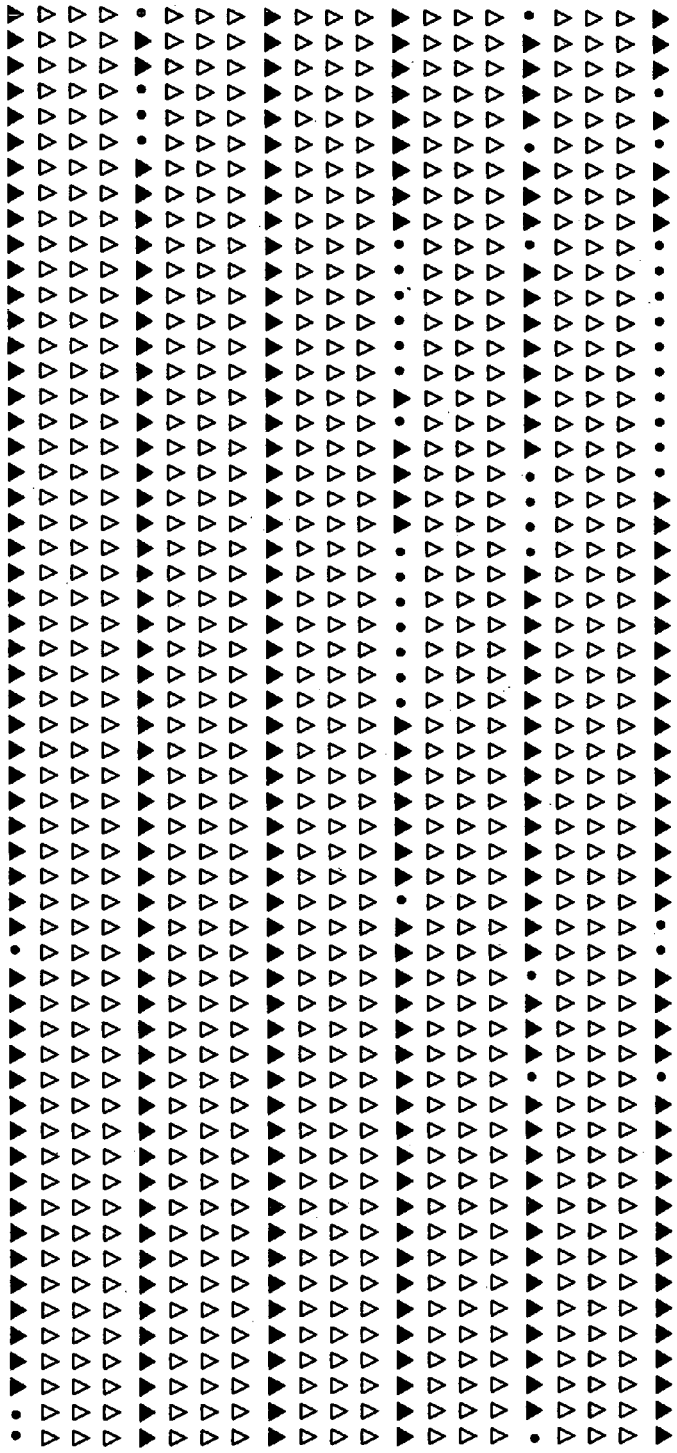
FIG. 6 is a schematic diagram of shot grid size of 56 by 21 with added stations.

The source grid was also changed by inserting through interpolation an additional 3 shots line between the existing 6 shot lines as shown in FIG. 6, thus increasing the number of shot lines to 21. This is equivalent to reducing the shot line spacing from 513 to 128 meters.

c) Create Interpolated Shot Gather

Utilizing the interpolation system in accordance with the system, shot gathers were created for each source grid shot (both actual and interpolated) having individual receiver traces for all receiver locations.

d) Results

Visual inspection of the interpolated shot gathers shows good results. Most interpolated data are stacked and/or pre-stack migrated. Visual inspection of the stacked sections and/or time slices shows preserved structural details, with increased S/N ratio, reduced acquisition footprints and a somewhat spatially smoothed look, which can be largely controlled by the fold parameter (k) and the damping ($\epsilon^2$).

EXAMPLES OF OUTPUT SHOT GATHERS

With reference to FIGS. 7–12, examples of shot interpolated and non-interpolated shot gathers are described in addition to other processing techniques to show the effectiveness of the method.

Figure 7:
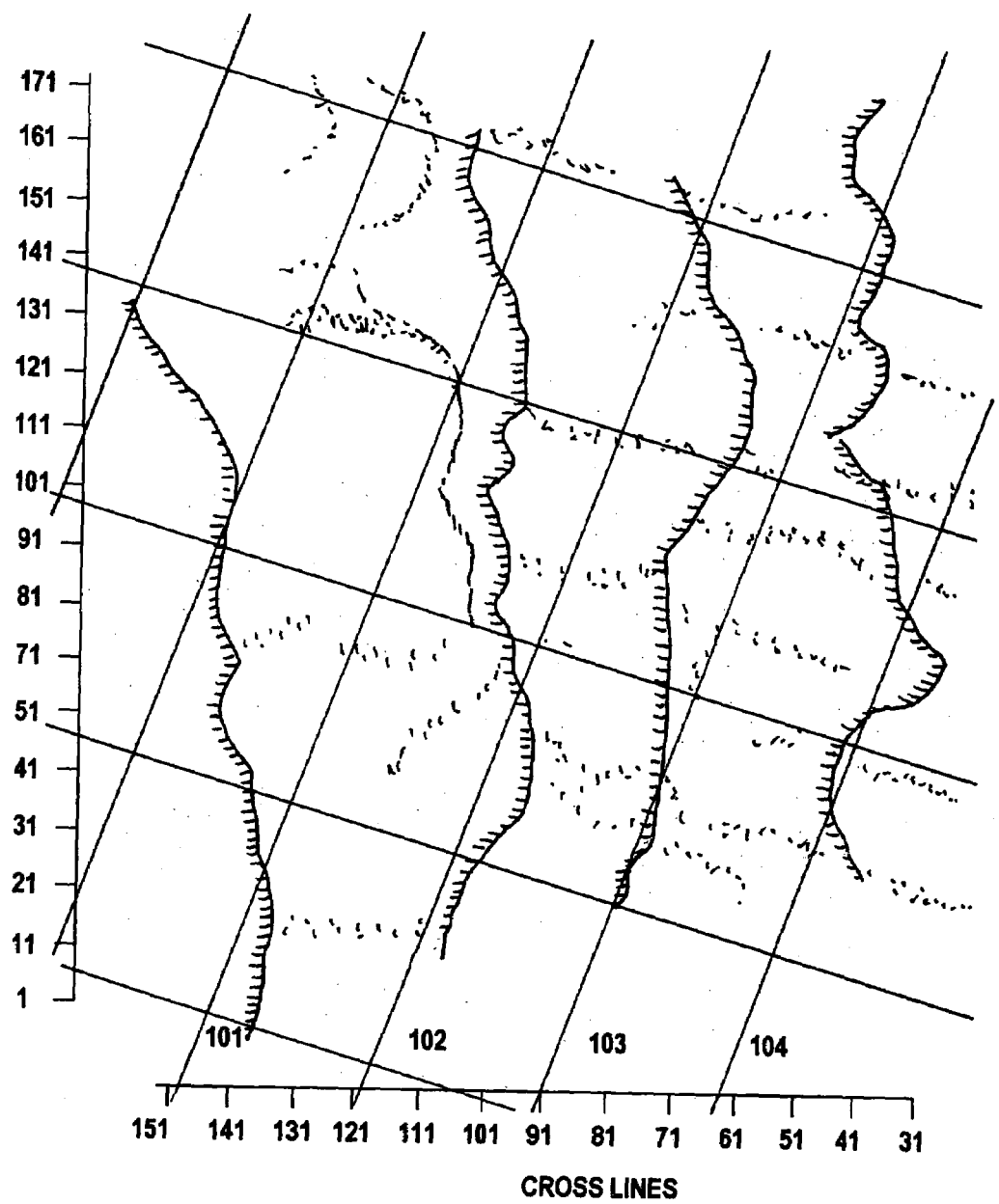
FIG. 7 a surface map detailing the location of real shot and receiver lines.

FIG. 7 shows a surface map detailing the location of real shot and receiver lines. In this example, the shot and receiver lines were placed along existing geographical features such as roads and rivers and, hence, the shot/receiver line density is substantially less than many seismic surveys. Thus, this example represents a relatively crude survey.

Figure 8:
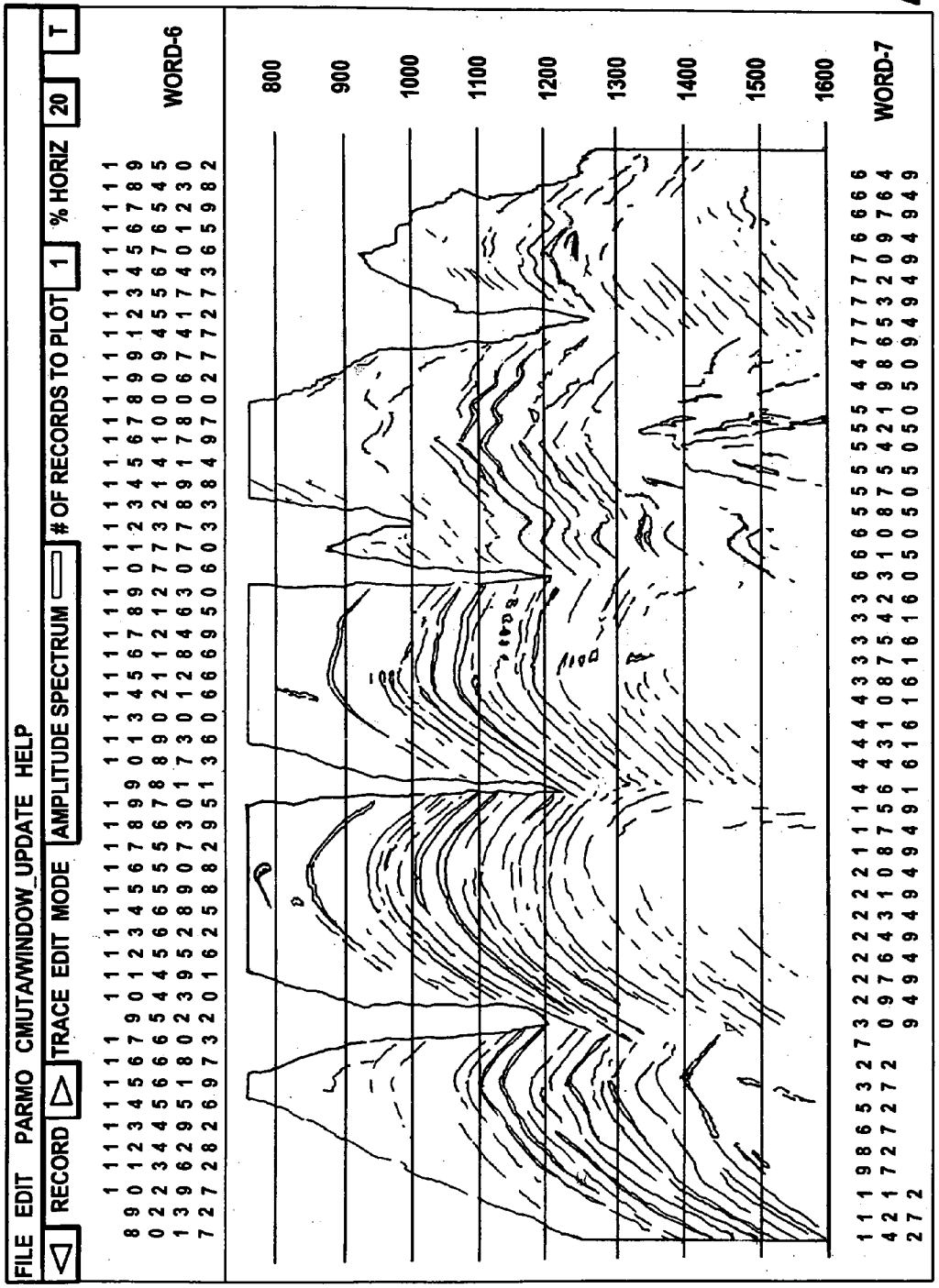
FIG. 8 shows a representative shot gather for real shot 388 for every third live receiver station.

FIG. 8 shows a representative shot gather for real shot 388 for each real receiver station and, accordingly shows a typical shot gather as is known in the art.

Figure 9:
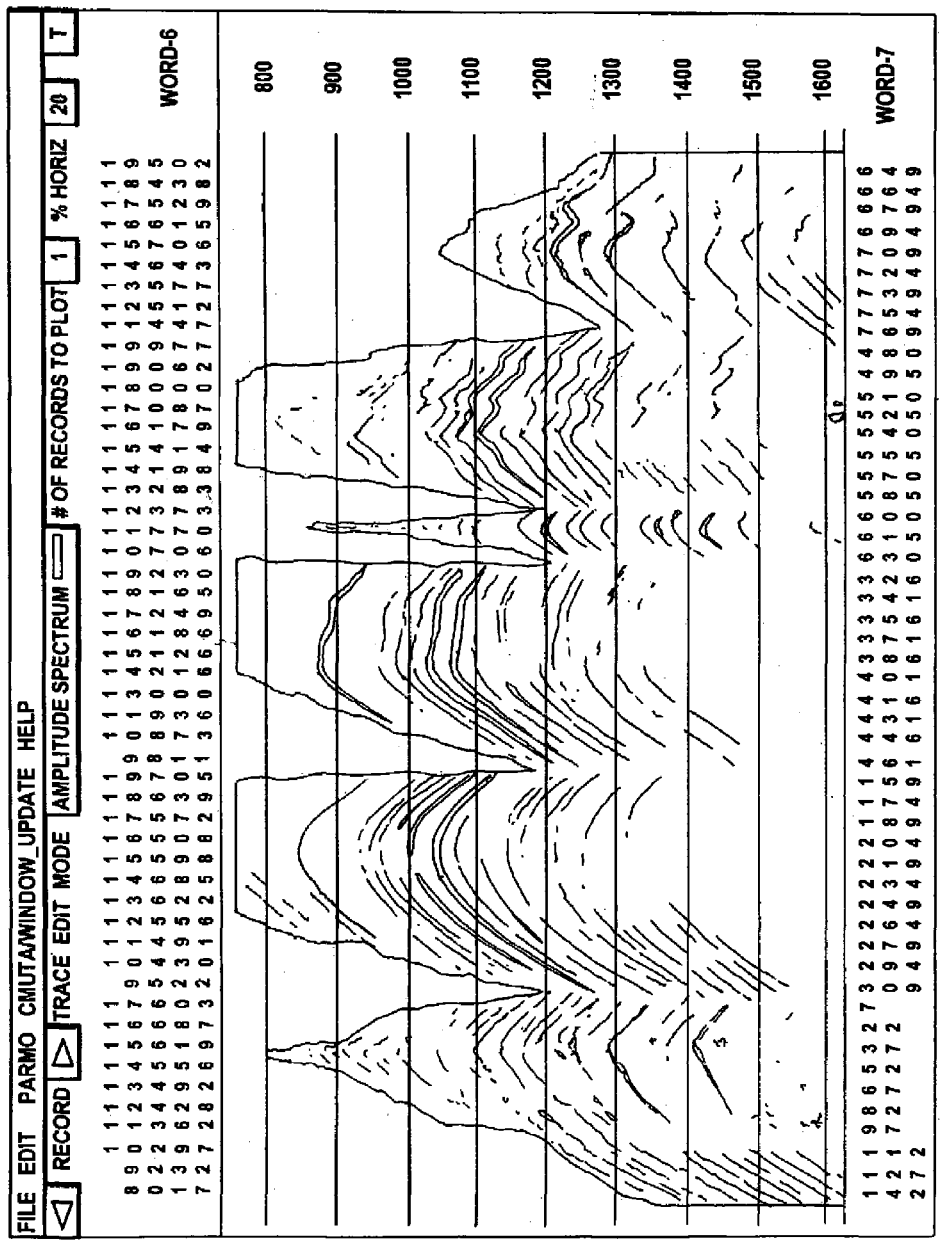
FIG. 9 shows a predicted shot gather for real shot 388 wherein 50% of the real shot gather traces were assumed not to exist.

FIG. 9 shows a predicted shot gather for real shot 388 wherein 50% of the real shot gather traces are assumed not to exist. Specifically, in generating the shot gather, each even numbered shot gather was ignored and the system in accordance with the invention utilized to predict the new shot gather traces at those even numbered location. As can be seen, in comparison to the raw data of FIG. 8, the system is effective in predicting the true formation and does not model the random noise which is apparent in FIG. 8.

Figure 10:
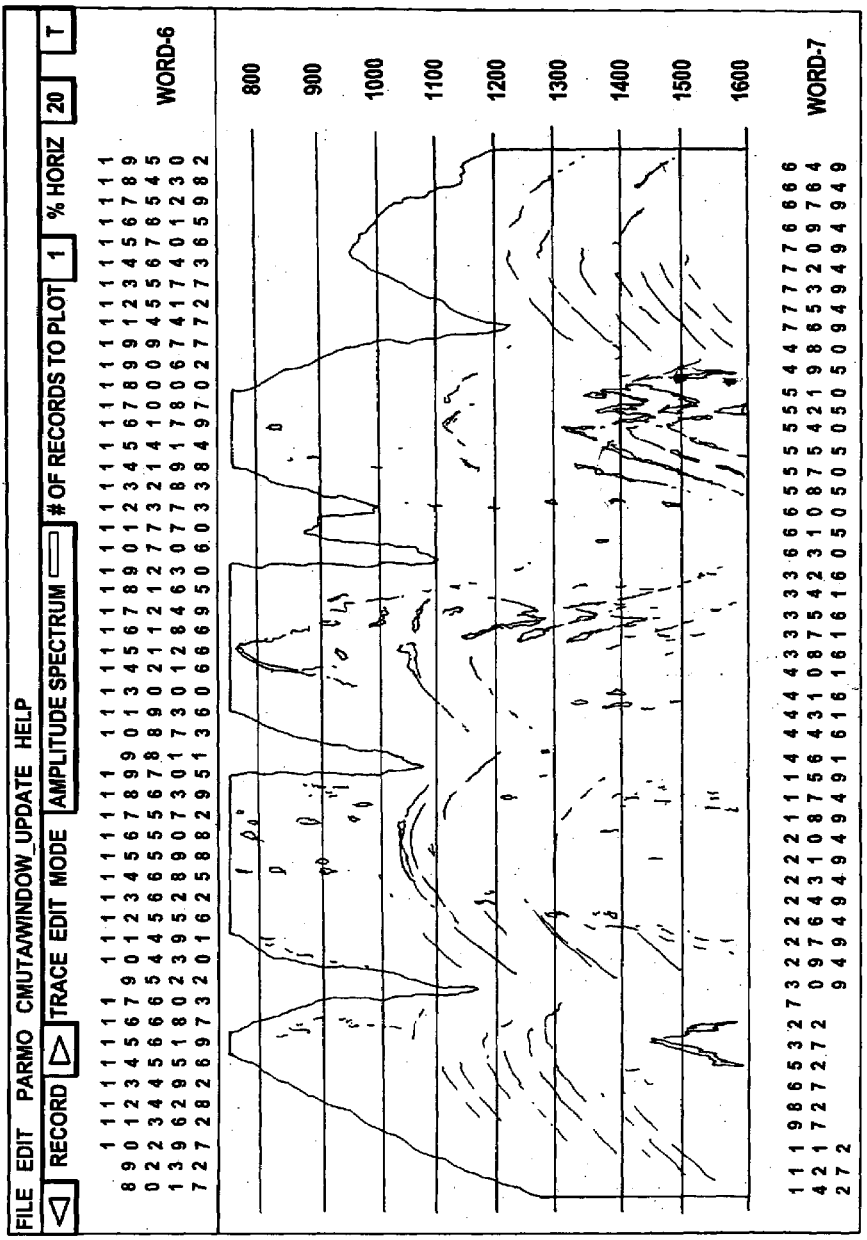
FIG. 10 shows the difference between the predicted data of FIG. 9 and the raw data of FIG. 8 for shot 388 and represents the lack of prediction of random noise.

FIG. 10 shows the difference between the predicted data of FIG. 9 and the raw data of FIG. 8 for shot 388. This shot gather represents the lack of prediction of random noise.

Figure 11:
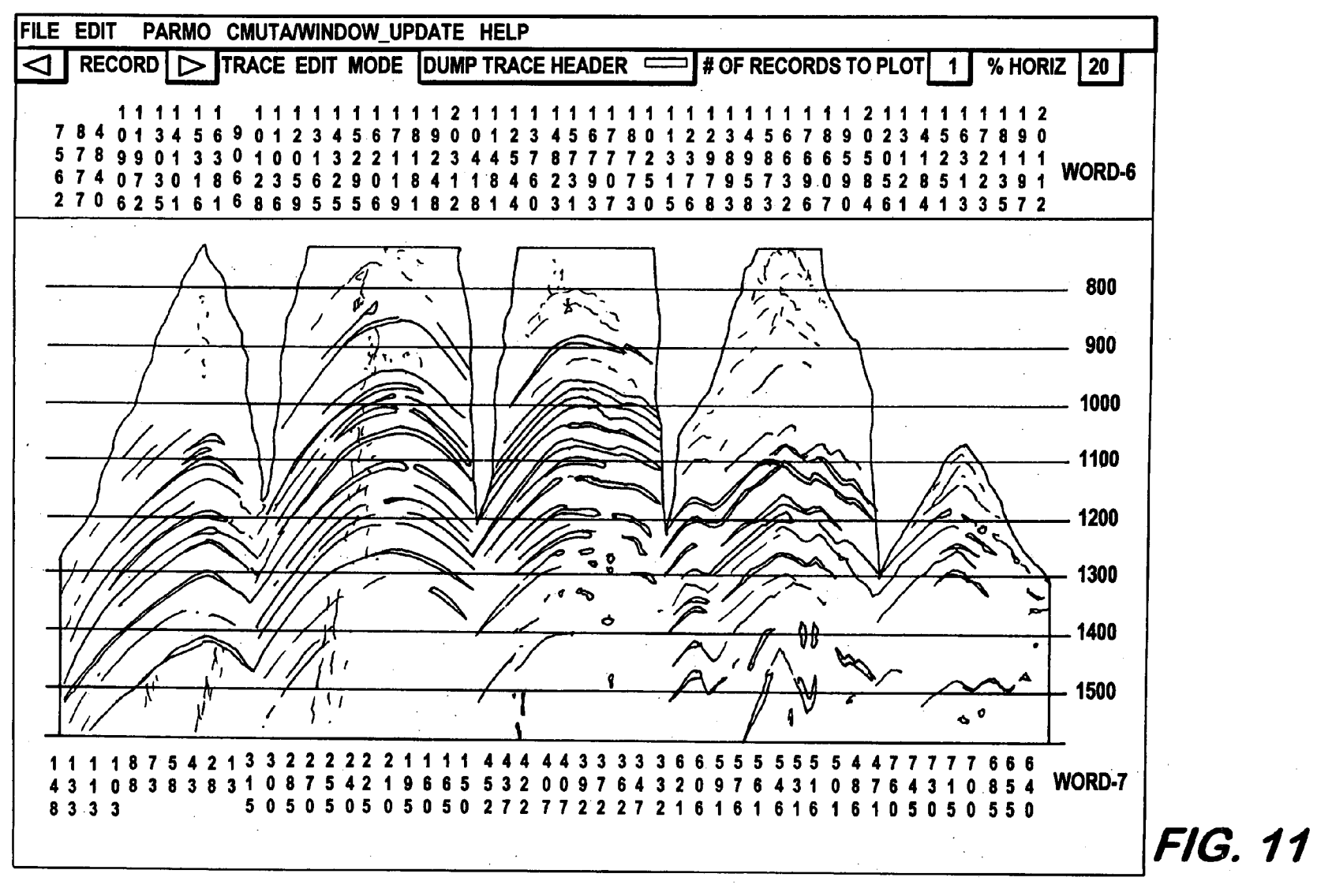
Figure 12:
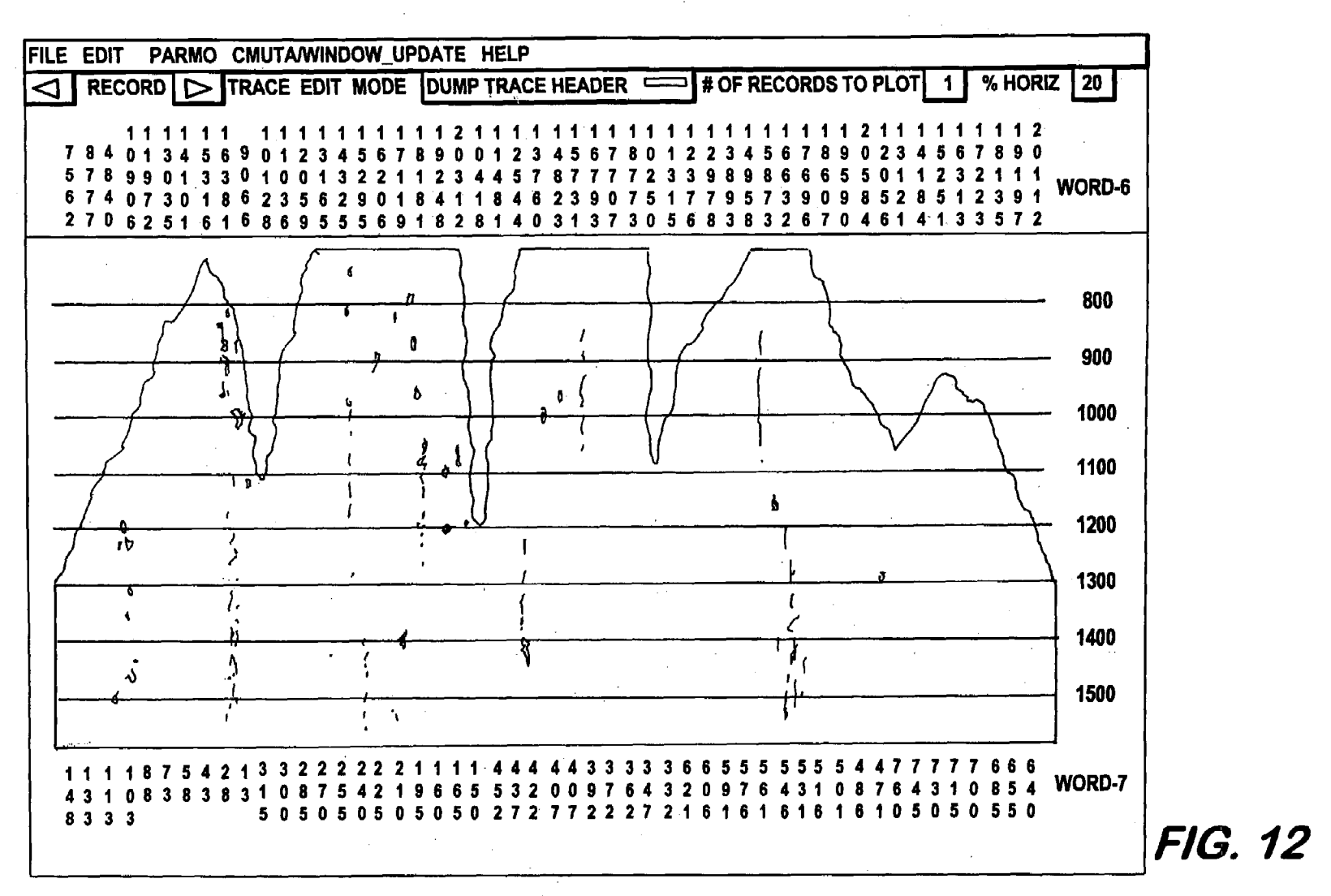

FIG. 11 shows a predicted shot gather for shot 388 in which the system was used to predict the shot gather utilizing all shots. As can be seen from FIG. 12, which shows the difference between the predicted data of FIG. 11 and the raw data of FIG. 7, the use of the system to predict a shot gather at non-interpolated positions is effective in eliminating the random noise associated with actual data.

Other

When survey data is collected sparsely, irregularly and with "holes", pre-stack interpolation may be used to resample the data onto a regular and/or denser shot and/or receiver grid. The resulting benefits include:

a) Stacking: Stacking fold is higher, leading to cleaner stacked sections. In addition, offset distributions are more uniform, leading to less acquisition foot prints and more reliable offset range limited partial stack.

b) Pre-stack migration: There are fewer dead traces, leading to less migration "smiles". In addition, the more finely sampled data makes numerical integration (the essence of migration) more accurate.

What is claimed is:

1. A method of generating output seismic trace data at a specified location from input seismic trace data from known locations comprising the steps of:
   selecting a specified location for the output data;
   selecting input data at known locations for fitting to a multi-order polynomial equation;
   obtaining polynomial fit parameters of the multi-order polynomial equation; and
   utilizing the polynomial fit parameters to obtain seismic trace data at the selected location by interpolation.

2. A method as in claim 1 wherein the step of selecting the location for the output data includes selection of both a desired source point and a desired receiver point.

3. A method as in claim 1 wherein the step of selecting input data at known locations for fitting to a multi-order polynomial equation includes selecting input data within a specified range of the specified location of the output data.

4. A method as in claim 3 wherein the specified range is defined by the parameters of an ellipse.

5. A method as in claim 3 wherein the input data within the specified range is further restricted by selection of input data closest to the specified location of the output data.

6. A method as in claim 1 wherein the step of obtaining polynomial fit parameters of the multi-order polynomial equation is solved numerically by a singular value decomposition of a matrix, C, defined by $C=ULV^T$.

7. A method as in claim 6 wherein a transformed coordinate system is utilized to speed up the computation time required to solve for the polynomial fit parameters of an interpolated trace.

8. A method as in claim 1 wherein each of the steps are repeated to form a shot gather corresponding to predicted receiver trace data at known or unknown locations and corresponding to a known source location or predicted source location.

9. A method as in claim 1 wherein the specified location is a known location and wherein the method is effective in reducing random noise associated with the trace data at that known location.

10. A method of creating a shot gather from known seismic trace data obtained from a plurality of known locations within an x,y grid, the method comprising the steps of:
- a. selecting a source location within the x,y grid to which the shot gather will correspond;
- b. selecting a plurality of receiver positions that will form receiver positions for the shot gather wherein at least one of the source location or receiver positions is an unknown position;
- c. selecting a plurality of receiver traces having known positions as input traces and utilizing the known receiver traces to interpolate receiver trace data at a location adjacent the known receiver positions utilizing a least-squares fitting model;
- d. repeating step c for all selected receiver positions so as to form a shot gather corresponding to the source location.

11. A method as in claim 10 wherein the source location is a location on the x,y grid that does not correspond to an actual source location.

* * * * *